(12) United States Patent
Hollinger et al.

(10) Patent No.: US 10,839,100 B2
(45) Date of Patent: Nov. 17, 2020

(54) REVERSE-TIERED MODEL TO MANAGE TEMPORAL ACCESS TO DATA

(71) Applicant: INTERNATIONAL BUSINESS MACHINES CORPORATION, Armonk, NY (US)

(72) Inventors: Michael C. Hollinger, Austin, TX (US); Kelley Anders, East New Market, MD (US); Jeremy R. Fox, Georgetown, TX (US); Grant D. Miller, Arvada, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 330 days.

(21) Appl. No.: 15/944,953

(22) Filed: Apr. 4, 2018

(65) Prior Publication Data

US 2019/0311153 A1    Oct. 10, 2019

(51) Int. Cl.
*H04L 29/06*   (2006.01)
*G06F 21/62*   (2013.01)
*G06F 16/955*  (2019.01)

(52) U.S. Cl.
CPC ........ *G06F 21/6245* (2013.01); *G06F 16/955* (2019.01)

(58) Field of Classification Search
CPC ....... G06F 21/6245; G06F 21/31; H04L 69/28
See application file for complete search history.

(56) References Cited

U.S. PATENT DOCUMENTS

| 7,848,456 | B2 * | 12/2010 | Merz | H04B 1/71632 375/260 |
|---|---|---|---|---|
| 8,613,070 | B1 * | 12/2013 | Borzycki | G06F 21/6218 726/8 |
| 8,869,235 | B2 * | 10/2014 | Qureshi | G06F 21/14 726/1 |
| 2013/0144729 | A1 | 6/2013 | Jones et al. | |
| 2015/0006731 | A1 * | 1/2015 | Ren | H04L 47/805 709/226 |
| 2015/0066656 | A1 | 3/2015 | Edwards | |
| 2016/0260134 | A1 | 9/2016 | Nagarajayya | |

* cited by examiner

*Primary Examiner* — Hosuk Song
(74) *Attorney, Agent, or Firm* — Griffiths & Seaton PLLC

(57) ABSTRACT

Embodiments for managing temporal access to data by a processor. Permission for communicating with a user for providing temporal consent data during a selected time window based on a plurality of factors may be established. The temporal consent data may be delivered during the selected time window.

17 Claims, 7 Drawing Sheets

US 10,839,100 B2

REVERSE-TIERED MODEL TO MANAGE TEMPORAL ACCESS TO DATA

BACKGROUND OF THE INVENTION

Field of the Invention

The present invention relates in general to computing systems, and more particularly to, various embodiments for providing a reverse-tiered model to manage temporal access to data by a processor.

Description of the Related Art

In today's society, consumers, businesspersons, educators, and others communicate over a wide variety of mediums in real time, across great distances, and many times without boundaries or borders. The advent of computers and networking technologies have made possible the intercommunication of people from one side of the world to the other. Smartphones and other sophisticated devices that rest in the palm of a person's hand allow for the sharing of information between users in an increasingly user friendly and simple manner. The increasing complexity of society, coupled with the evolution of technology continue to engender the sharing of a vast amount of information between consumers, businesspersons, educators, and others. However, protecting the digital privacy of data such as, for example, personal data is of paramount importance.

SUMMARY OF THE INVENTION

Various embodiments for managing temporal access to data by a processor are provided. In one embodiment, by way of example only, a method for managing temporal access to data, again by a processor, is provided. Permission for communicating with a user for providing temporal consent data during a selected time window based on a plurality of factors may be established. The temporal consent data may be delivered during the selected time window.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
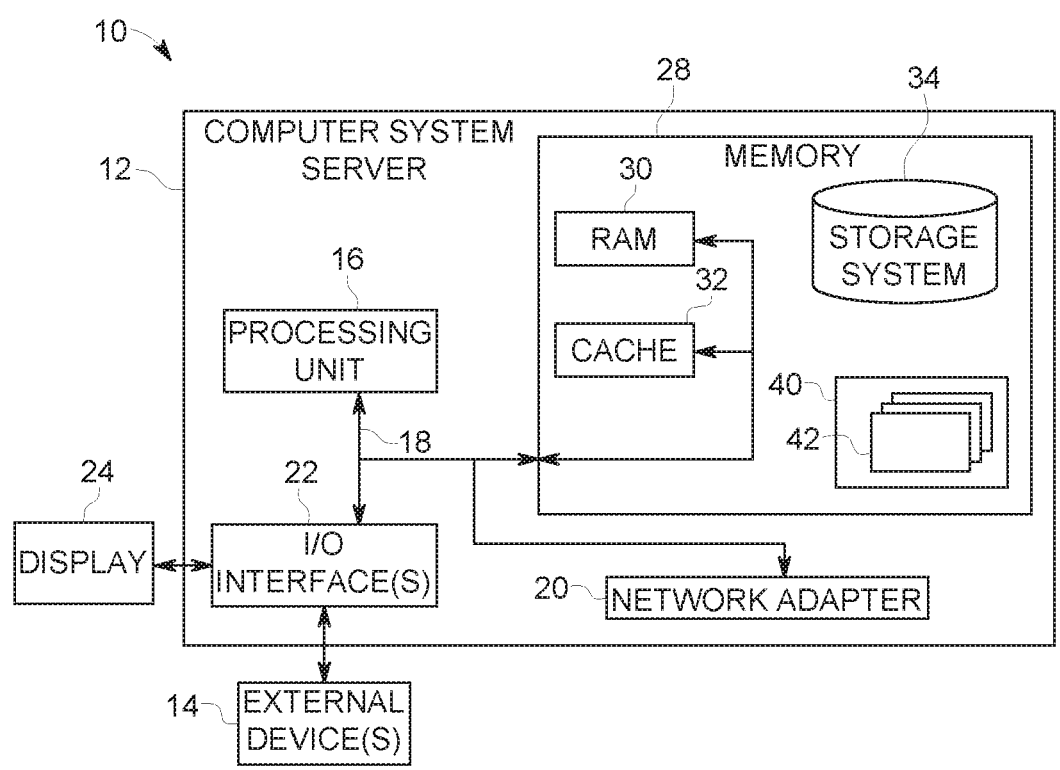
FIG. 1 is a block diagram depicting an exemplary cloud computing node according to an embodiment of the present invention.

With the increased globalization of various entities (e.g., users, organizations, and/or companies) and tendency for collaboration across different entities and geographically-bound jurisdictions, privacy issues have become a concern. This is particularly true where digital privacy breaches and abuses lead to identity theft and marketing abuse (e.g., spear phishing and spam). For example, with the increasing popularity of the Internet and the World Wide Web ("WWW"), it has become common to set up websites for advertising, marketing, and selling goods and services as well as providing product and other information and customer services. Examples for such websites are online stores for books, computers and other goods, websites providing information on the stock market, travel information or weather reports, and search engines and access to databases.

However, users may unknowingly disclose information (e.g., personal data) that companies then buy from, or sell to, "trusted third-party" data brokers, which may or may not be valid at a subsequent time. These trusted, third-party entities may have collected data and/or communicated various items to a user according to obtained user data. Users have no way to control the accuracy of data nor control the duration that an entity is a trusted third-party and therefore able to access the data. Thus, a need exists to enable users to control the accuracy of data and duration a trusted third-party has access to user data to enhance digital privacy.

In one aspect, the present invention provides for a reverse-tiered model providing temporal control to manage temporal access to user data (e.g., personal data). In one aspect, consent to communicate with a user is provided for a specific time boxed window so as to ensure content is delivered and/or redacted with accuracy based on multiple decision point(s) or factors. The specific time boxed window (e.g., a selected period of time) may be revoked and/or adapted. For example, temporal control to personal data and temporal access to communicate with a user may be provided such as, for example, permission to access personal data or permission to communicate with a user for a selected period of time (e.g., 24 hours) and then amending or revoking all access to user data and permission to communicate with the user. The revoking of all access to user data, specificity of data, and permission to communicate with the user may degrade over time. Thus, the present invention time boxes and encapsulates data for certain periods of temporal access.

In an additional aspect, limited temporal consent to data, content, personal data, or personal information may be established. Temporal-based expiration data, pertaining to permission to access, or use of, personal data or information may be delivered. Access to personal data may be revoked, adapted, or reauthorized based on one or more events or triggers. A user may be enabled to control limited consent to personal data based on purpose and scope for accessing the personal data.

Moreover, various embodiments are provided herein for a temporal/time-based approach to revoke displaying an advertisement on a user's webpage, based on analysis of recently accessed data by the user. A reverse-tiered, limited temporal-consent model may be created and used that erases user information and metadata, associated with the recently accessed data by the user, after a timestamp from a third-party system. More specifically, the mechanisms of the illustrated embodiments monitor and create a bread crumb trail of a user accessing specific content such as, for example, on a webpage or multiple websites. A third-party may be trusted and provided with consent, permission, and/or a right to identify and display content (e.g., advertisement) on a webpage visited by a user, based on analysis of metadata or attributes associated with the contents accessed by the user and the user's personal information.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
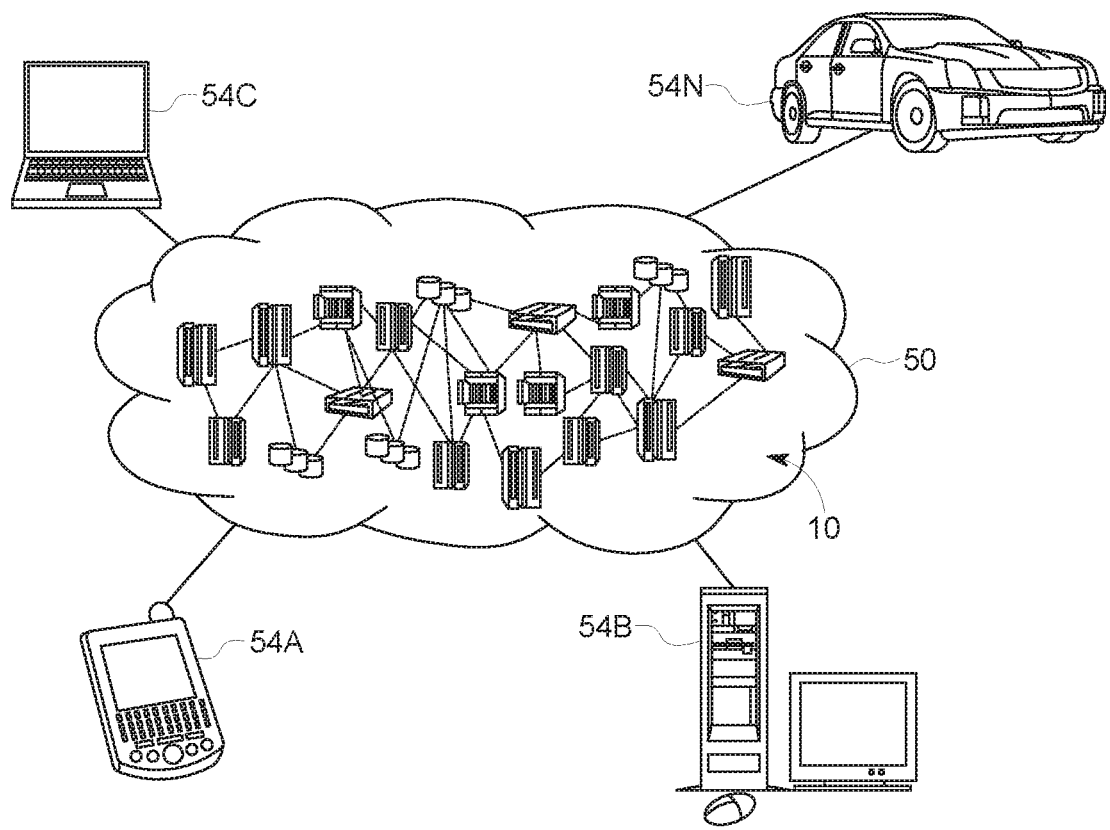
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
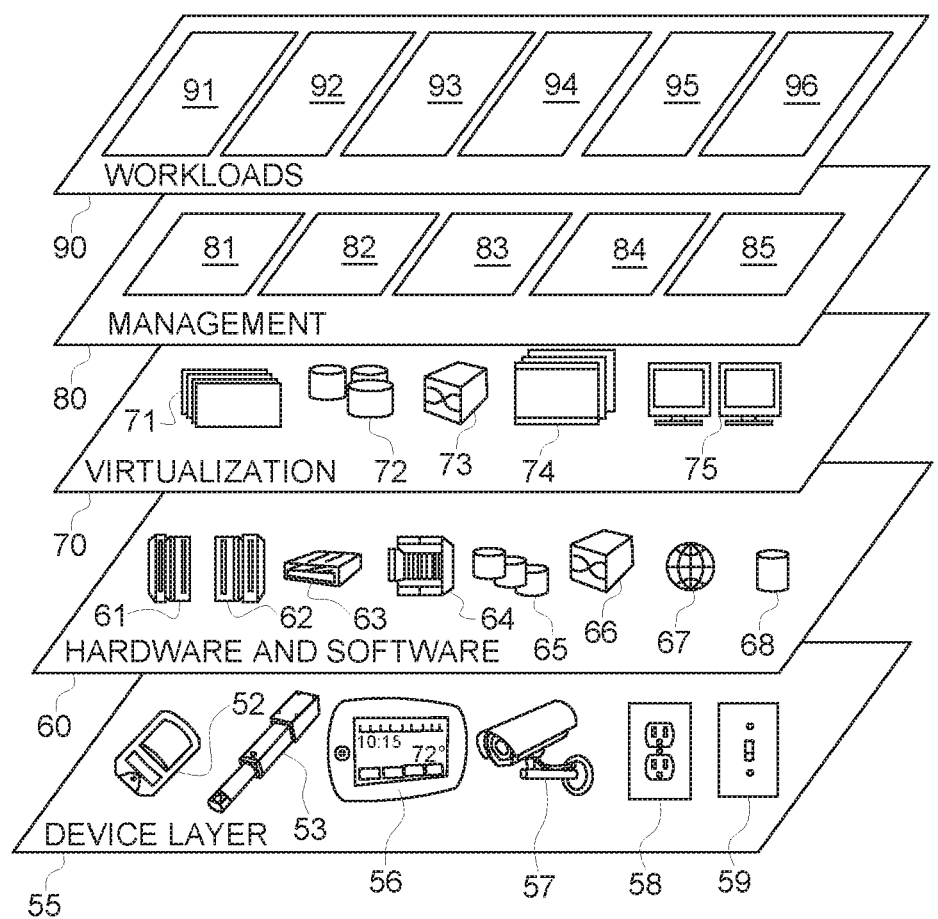
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing temporal access to data. In addition, workloads and functions 96 for managing temporal access to data may include such operations as data analytics, data analysis, and as will be further described, notification functionality. One of ordinary skill in the art will appreciate that the workloads and functions 96 for managing temporal access to data may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for managing temporal access to data. These mechanisms include functionality that establishes permission for communicating with a user and/or accessing user data for providing temporal consent data during a selected time window based on a plurality of factors. The temporal consent data may be delivered during the selected time window.

In view of the foregoing, consider the following example. Consider a use case where a user visits a website to research a vacation to a desired destination. The website visited by the user acquires information about the user (without any user input or control of this data being accessed) and provides the data to a third-party entity (e.g., an advertiser). The user shortly thereafter begins receiving advertisements ("ads") from the third-party on websites the user subsequently visits or in a feed (e.g., news feed) of a social media account pertaining to the Bahamas. Accordingly, in this use case example, the present invention protects the user from the privacy infringement of the user's internet privacy and enables a user to receive and/or view one or more relevant ads that may become more generalized over time. For example, the present invention (using the same use case example) enables a showing of a "resort on Island X" advertisement for only a defined period of time (e.g., 90 minutes), and then generalizes the advertisement by showing an "island vacation" advertisement for a second, defined period of time (e.g., only four hours). Following the second, defined period of time, a more generalized advertisement (as compared to the previous advertisements) may be shown such as, for example, a "vacation getaway" advertisement for a third, defined period of time (e.g., 12 hours) and then the most general advertisement related to "travel" in general for an nth, defined period of time (e.g., for the next several days).

Figure 4A:
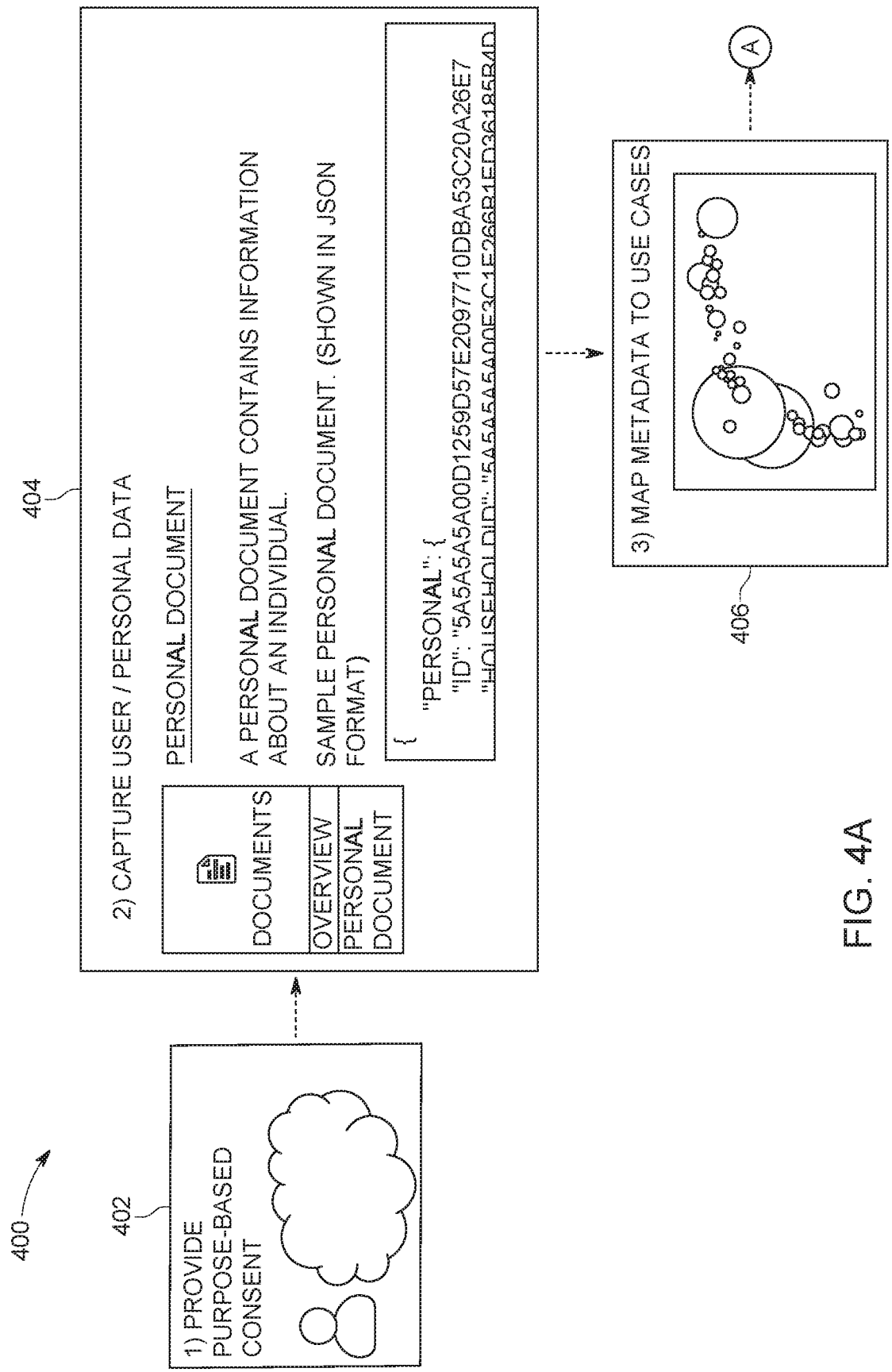
FIGS. 4A-4B is a block/flow diagram illustrating certain aspects of functionality according to the present invention.
Figure 4B:
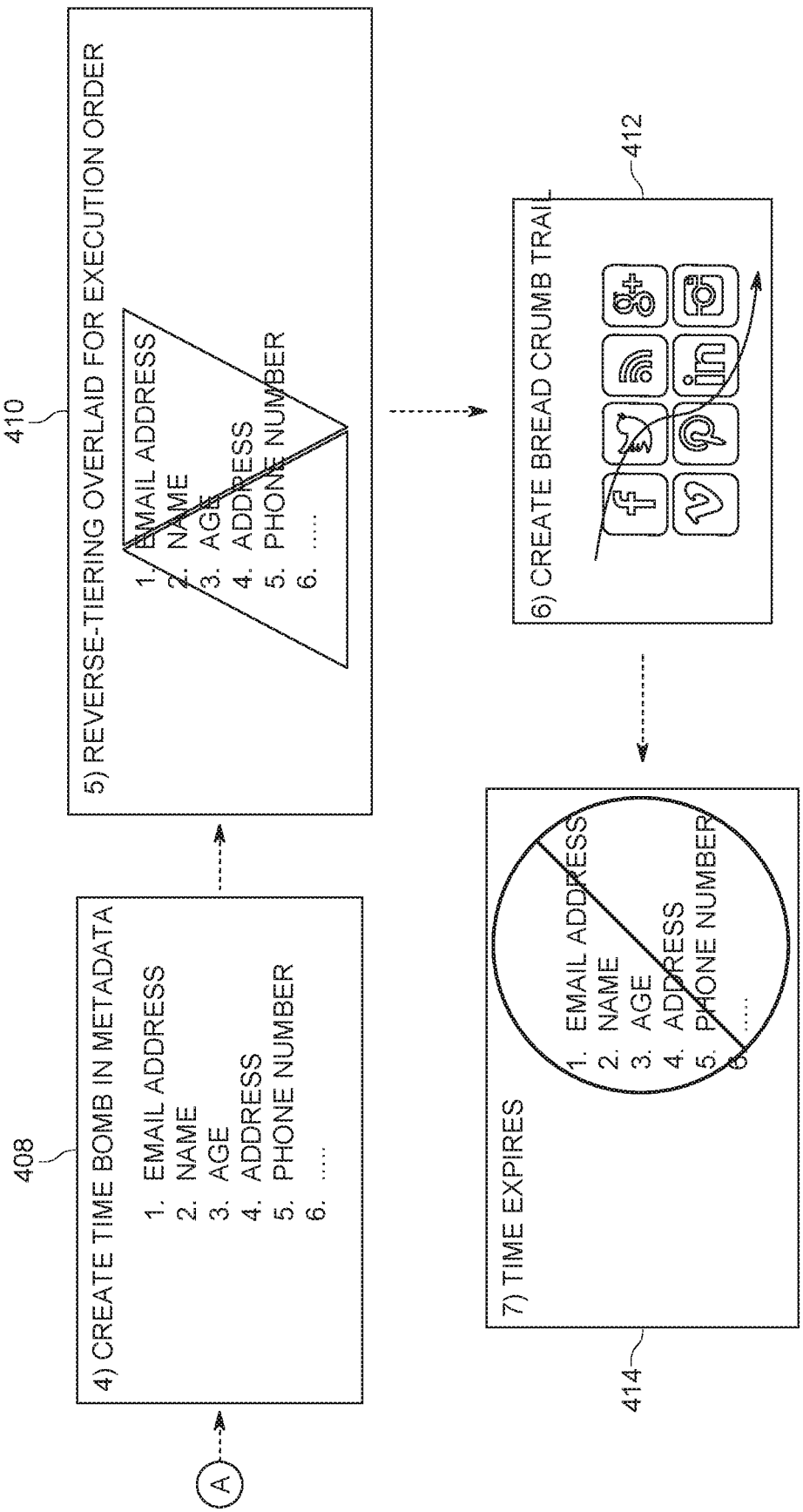

In view of the above use case example, consider, as an illustration of exemplary functional blocks to accomplish various purposes of the present invention, FIGS. 4A-4B, following. FIGS. 4A-4B illustrate these exemplary functional blocks 400 and associated notes on specific functionality (as denoted by the doted boxes). Each of the functional blocks 400 may be implemented in hardware and/or software, such as by the computer/server 12 (FIG. 1), and/or the workloads layer 90 (FIG. 3). Thus, one or more of the functional components described in FIGS. 1-3 may be used to accomplish the purposes and functionality described in FIGS. 4A-4B.

In the depicted embodiment, a user profile block 402 provides purpose-based consent. That is, the user provides purposed-based consent to one or more third-party systems to use the user data (e.g., permission granted to use personal data of the user) and/or to receive one or more items (e.g., advertisements) from one or more third-party systems (e.g., a reverse auction system as used in a social media platform or search engine service). The user may provide permission to access personal data and/or permission to receive one or more items. That is, the user may provide permission to access personal data and/or permission to receive one or more items according to a plurality of factors such as, for example: 1) a purchased right, by a third-party, to acquire rights and permission to be a trusted third-party, 2) purpose or intent of a user, 3) a consent operation, and/or 4) a selected time period (e.g., a time window). In one aspect, the user may select a desired "sponsorship" level, where the sponsorship enables a user to increase and/or decrease a rate at which advertisements are presented to the user, or details of the advertisement. For example, a user may indicate a willingness to pay a first monetary value (e.g., $5) so the third-party entity may only provide generic data, or the user may agree to pay a selected value (e.g., $1) and the third-party entity may then obtain a name and address of the user, and/or a user may state an unwillingness to pay and the third-party may receive access to all user data and permission to provide content.

As in system capture block 404, permission may be granted to enable a third-party to capture user data (e.g., personal data). That is, metadata and/or attributes associated with the user's information may be captured. The user information may include, but without limitations, a schema that a data broker may use such as, for example, a name, user identification ("ID"), account data, income level data, a location and/or address, schedule data (e.g., calendar data), and the like.

In mapping block 406, the present invention provides for mapping metadata to one or more use cases. That is, the present invention provides for determining which pieces of metadata are most appropriate for a specific use case scenario with one of the following, but not limited to: user driven preferences, system default preferences, and/or even a hybrid operation (e.g., a user's preferences may supersede standardized system preferences). For example, consider the following two scenarios. In scenario 1, a user may read up to five free articles on a website of a newspaper before hitting a "paywall" requiring a fee prior to accessing additional articles. The present invention may, however, provide an alternative offer which the user may select that states "for news media, I, user "A", prefer to pay nothing and am ok with the website acquiring, accessing, and knowing my name for the duration of the visit, and my anonymized demographic data for X years." In scenario 2, a different user may indicate "I, user "B," want to disclose no information and I will pay up to $3 per month for access to this material." The website of the newspaper may request that the user pay $5 for access to this material or disclose demographic data. In one aspect, a mechanism of the illustrated embodiments may select a set of rules that most closely-align with the user's preferences (e.g., most similar rules compared to the preferences of the user). In scenario 2, the present invention may offer the user (e.g., user "B") a choice of either accessing the content for $5, or not accessing it at all and maintaining their privacy preferences.

In time bomb block 408, a selected time window or "time bomb" may be created on metadata. For example, an expiring time bomb may be created that may be associated with the user's information and metadata saving a tuple consisting of: metadata (e.g., advertisement instance IDs), attributes (e.g., user income, location), and/or a time bomb (e.g., 12 PM Jun. 4, 2017). That is, the present invention provides time-boxed, temporal-based access to consented data.

In a reverse-tiering block 410, reverse-tiering may be overlaid with the information from blocks 406 and 408 to provide a sequence of execution. In other words, reverse-tiering may be overlaid with the information from blocks 406 and 408 to provide a sequence of execution means to degrade access over a selected period of time. For example, given the information gathered in the previous blocks (e.g., metadata, user attributes, consent granted, and requests asked), the present invention provides and enables a tiered approach. For example, a travel website may be enabled to identify a visitor (e.g., learn and know the name and show the profile picture of the user for the duration of the visit) to enable the visitor to make a reservation for travel. After scheduling the reservation on the website by the visitor, the travel website is enabled to identify and know the name of the visitor for the duration of the reservation. However, by degrading access to the knowledge of the user over a selected period of time, the specific user information about the visitor obtained by the website is degraded over a selected period of time (e.g., 10 days) after the reservation is complete. After the reservation is complete, the website may be restricted to only maintaining anonymized demographic data (e.g., location, interests, aggregate buying habits, etc.) for an additional selected period of time (e.g., 1 year). After expiration of the additional selected period of time, the website may be required to delete all data including the anonymized demographic data.

In a bread crumb trail block 412, a "bread crumb trail" may be created for where ever that data is propagated. That is, a bread crumb trail may be a path including a link to each webpage or internet site previously displayed to, or visited by, the user or entity seeking to be a trusted third-party. The bread crumb trail may also be a path the entity, seeking to establish permission to access user data or provide content to a user, has taken to reach the user. For example, a user may have shared content on a profile of an employment/social media platform and was contacted by a potential employer who used a service having access to the social media platform. The bread crumb trail enables the user to understand the source of the contact and the path illustrating how the entity contacted the user.

In time expiration block 414, upon expiration of the time bomb (e.g., selected time window), the reverse-tier model may be traversed and begin iterating on captured data. Upon the expiration of the time bomb (e.g., the time bomb goes off), all data and permission may be erased. A snapshot may be used that indicates that the temporal consent data is only good for a selected period of time.

Further, the mechanisms of the illustrated embodiments predict the "consent" time box (e.g., defined time window) based on the user activity pattern. For example, searching, by a user, for "flights in May to City X" may indicate that the user should have a decision by April to terminate sending the user advertisements for a visit to City X at the end of April. If the user changes and searches for flights to a different destination, the information and/or defined time window (e.g., time bomb) may be adapted, revoked, reauthorized, and/or adjusted. It should be noted that permission for communicating with a user for providing temporal consent data during a selected time window based on a plurality of factors may be reauthorized based on one or more triggers and events. For example, if a user revisits a previously observed website following the expiration of a time bomb previously associated with the visited website, this event of revisiting the website may trigger an additional time bomb. In other words, revisiting the website may "reauthorize" a trusted third-party to provide content (e.g., an advertisement) to the user during a subsequent, selected window of time.

In an additional aspect, a blockchain "smart contract" decryption capability for demographic data may be disabled over a selected period of time such as, for example, by using a smart contract that implements reverse-tier rules established by the user and advertiser. For example, a blockchain may include one or more smart contracts that specify transactions among entities. That is, a smart contract, specifying terms for providing an entity (e.g., an advertiser) access to user data (e.g., personal data) and permission for providing content (e.g., an advertisement) to a user may be created in a blockchain. The smart contract may include the reverse-tier rules established by the user and advertiser such as, for example, those rules and operations described in FIGS. 1-4A-B.

Figure 5:
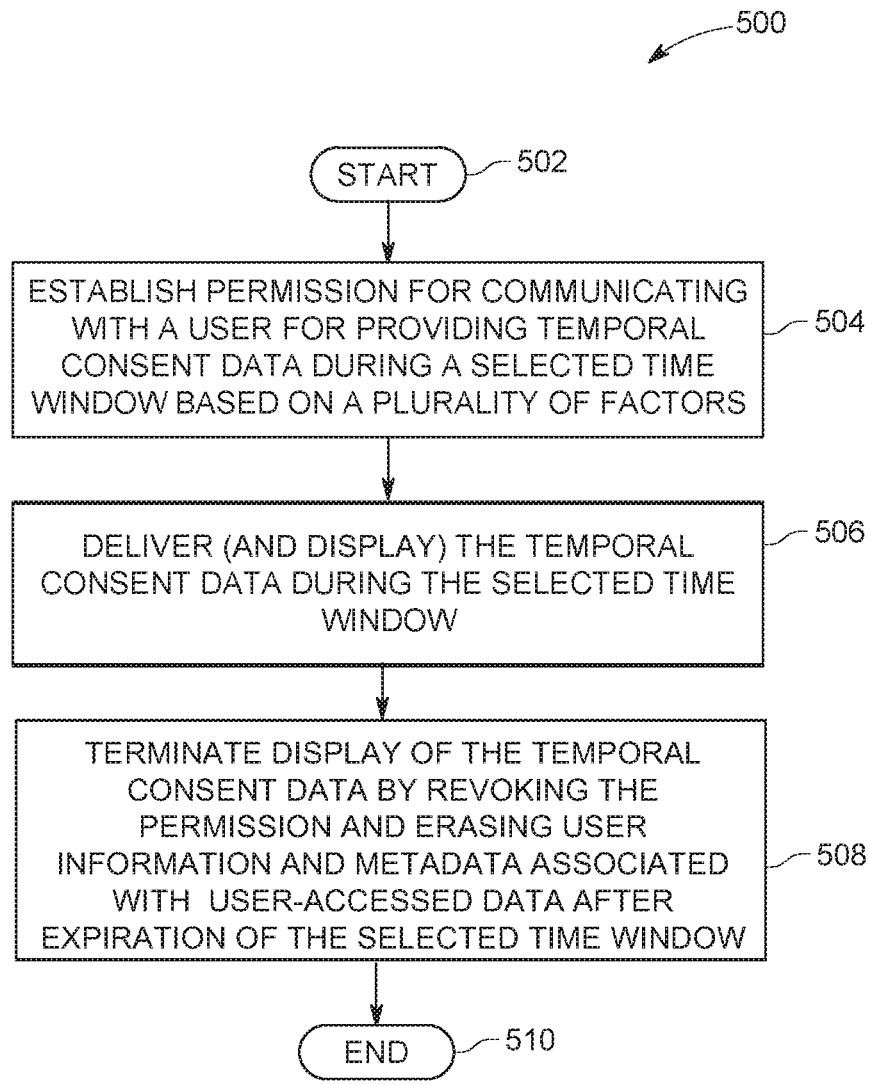
FIG. 5 is a flowchart diagram depicting an exemplary method for providing a reverse-tiered model to manage temporal access to personal data, again in which various aspects of the present invention may be realized.

Turning now to FIG. 5, a method 500 for managing temporal access to data by a processor is depicted, in which various aspects of the illustrated embodiments may be implemented. The functionality 500 may be implemented as a method executed as instructions on a machine, where the instructions are included on at least one computer readable medium or one non-transitory machine-readable storage medium.

The functionality 500 may start in block 502. Permission for communicating with a user for providing temporal consent data during a selected time window based on a plurality of factors may be established, as in block 504. The temporal consent data may be delivered during the selected time window, as in block 506. The display of the temporal consent data may be terminated by revoking the permission and erasing user information and metadata associated with user-accessed data after expiration of the selected time window, as in block 508. The functionality 500 may end, as in block 510.

In one aspect, in conjunction with and/or as part of at least one block of FIG. 5, the operations of method 500 may include each of the following. The operations of method 500 may analyze user information and metadata to determine the temporal consent data to be displayed during the selected time window. The temporal consent data may be displayed during the selected time window according to the permission. The temporal consent data may be displayed on one or more webpages according to user information and metadata of user-accessed content on the one or more webpages.

The operations of method 500 may dynamically revoke, adapt, or reauthorize the permission or consent to access user data and/or provide content to the user (e.g., provide an advertisement) according to one or more events or triggers. The operations of method 500 may terminate display of the temporal consent data based on analysis of user-accessed data by erasing user information and metadata associated with the user-accessed data after expiration of the selected time window. Also, a bread crumb trail of user-accessed content on one or more webpages may be created and monitored.

Figure 6:
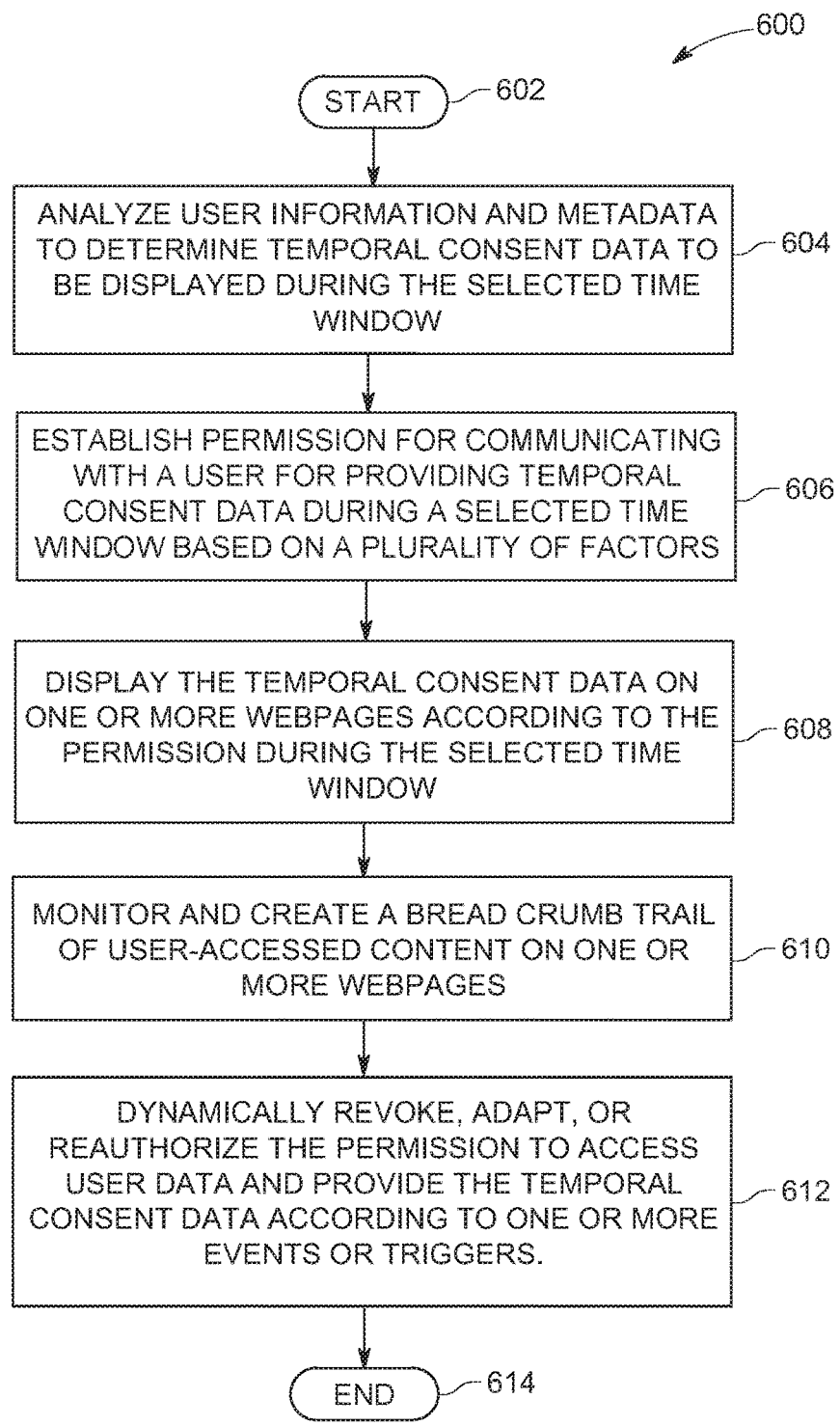
FIG. 6 is a flowchart diagram depicting an additional exemplary method for providing a reverse-tiered model to manage temporal access to personal data, again in which various aspects of the present invention may be realized.

Turning now to FIG. 6, a method 600 for managing temporal access to data by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium.

The functionality 600 may start in block 602. User information and metadata may be analyzed to determine temporal consent data to be displayed during the selected time window, as in block 604. Permission for communicating with a user may be established (and granted) for providing temporal consent data during a selected time window based on a plurality of factors, as in block 606. The temporal consent data may be displayed on one or more webpages according to the permission during the selected time window, as in block 608. A bread crumb trail of user-accessed content on one or more webpages may be monitored and created, as in block 610. The permission to access user data and provide the temporal consent data may be dynamically revoked, adapted, or reauthorized according to one or more events or triggers, as in block 612. The functionality may end, as in block 614.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing temporal access to data by a processor, comprising:
establishing permission for communicating with a user for providing temporal consent data during a selected time window based on a plurality of factors;
delivering the temporal consent data during the selected time window; and
automatically terminating display of the temporal consent data based on an analysis of user-accessed content by erasing user information and metadata associated with the user-accessed content after expiration of the selected time window, wherein prior to the expiration of the selected time window, the temporal consent data is iteratively degraded such that the user information and metadata becomes increasingly anonymized over a duration of the selected time window.

2. The method of claim 1, further including analyzing the user information and metadata to determine the temporal consent data to be displayed during the selected time window.

3. The method of claim 1, further including displaying the temporal consent data during the selected time window according to the permission.

4. The method of claim 1, further including displaying the temporal consent data on one or more webpages according to the user information and metadata of the user-accessed content on the one or more webpages.

5. The method of claim 1, further including dynamically revoking, adapting, or reauthorizing the permission to access user data and provide the temporal consent data according to one or more events or triggers.

6. The method of claim 1, further including monitoring and creating a bread crumb trail of the user-accessed content on one or more webpages.

7. A system for managing temporal access to data, comprising:
one or more computers with executable instructions that when executed cause the system to:
establish permission for communicating with a user for providing temporal consent data during a selected time window based on a plurality of factors;
deliver the temporal consent data during the selected time window; and
automatically terminate display of the temporal consent data based on an analysis of user-accessed content by erasing user information and metadata associated with the user-accessed content after expiration of the selected time window, wherein prior to the expiration of the selected time window, the temporal consent data is iteratively degraded such that the user information and metadata becomes increasingly anonymized over a duration of the selected time window.

8. The system of claim 7, wherein the executable instructions further analyze the user information and metadata to determine the temporal consent data to be displayed during the selected time window.

9. The system of claim 7, wherein the executable instructions further display the temporal consent data during the selected time window according to the permission.

10. The system of claim 7, wherein the executable instructions further display the temporal consent data on one or more webpages according to the user information and metadata of the user-accessed content on the one or more webpages.

11. The system of claim 7, wherein the executable instructions further dynamically revoke, adapt, or reauthorize the permission to access user data and provide the temporal consent data according to one or more events or triggers.

12. The system of claim 7, wherein the executable instructions further monitor and create a bread crumb trail of the user-accessed content on one or more webpages.

13. A computer program product for, by a processor, managing temporal access to data, the computer program product comprising a non-transitory computer-readable storage medium having computer-readable program code portions stored therein, the computer-readable program code portions comprising:

an executable portion that establishes permission for communicating with a user for providing temporal consent data during a selected time window based on a plurality of factors;

an executable portion that delivers the temporal consent data during the selected time window; and an executable portion that automatically terminates display of the temporal consent data based on an analysis of user-accessed content by erasing user information and metadata associated with the user-accessed content after expiration of the selected time window, wherein prior to the expiration of the selected time window, the temporal consent data is iteratively degraded such that the user information and metadata becomes increasingly anonymized over a duration of the selected time window.

14. The computer program product of claim 13, further including an executable portion that analyzes the user information and metadata to determine the temporal consent data to be displayed during the selected time window.

15. The computer program product of claim 13, further including an executable portion that:

displays the temporal consent data during the selected time window according to the permission; and displays the temporal consent data on one or more webpages according to the user information and metadata of the user-accessed content on the one or more webpages.

16. The computer program product of claim 13, further including an executable portion that dynamically revokes, adapts, or reauthorizes the permission to access user data and provide the temporal consent data according to one or more events or triggers.

17. The computer program product of claim 13, further including an executable portion that monitors and creates a bread crumb trail of the user-accessed content on one or more webpages.

* * * * *